Patented Sept. 5, 1922.

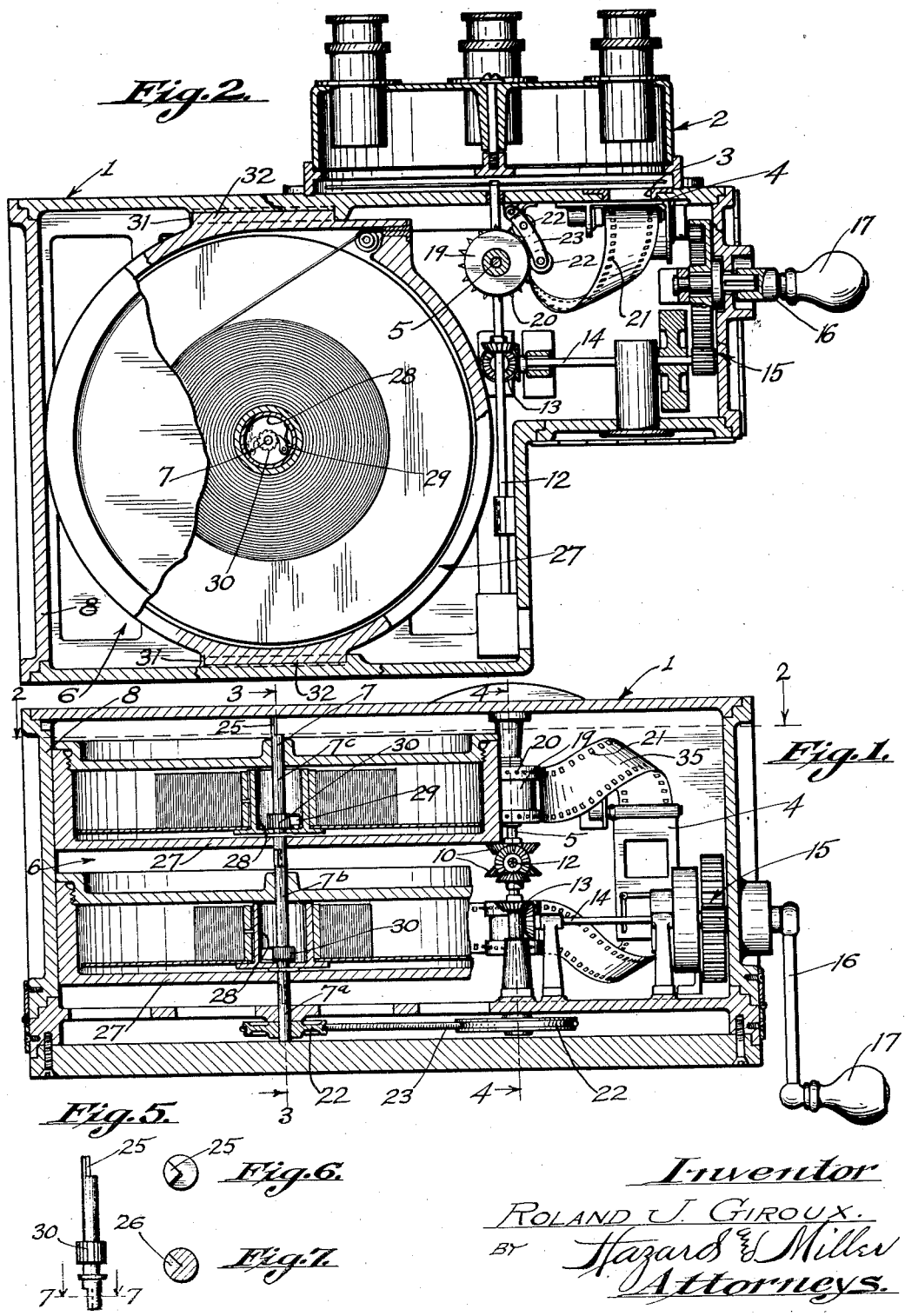

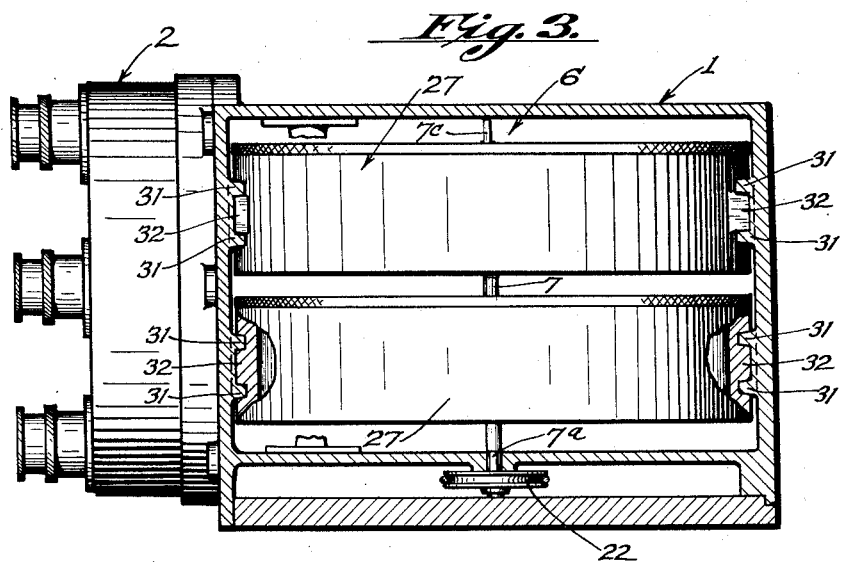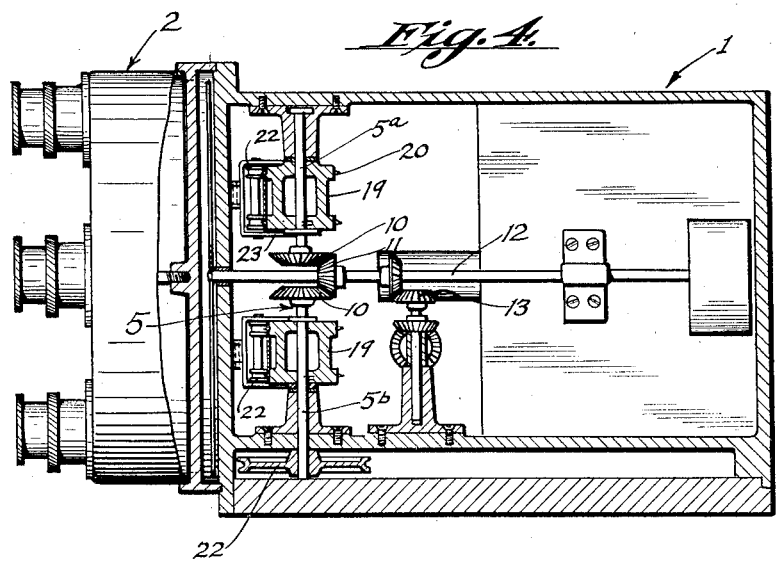

1,428,480

UNITED STATES PATENT OFFICE.

ROLAND J. GIROUX, OF LOS ANGELES, CALIFORNIA.

FILM MAGAZINE FOR MOTION-PICTURE CAMERAS.

Application filed November 11, 1920. Serial No. 423,348.

*To all whom it may concern:*

Be it known that I, ROLAND J. GIROUX, a citizen of the United States, residing at Los Angeles, in the county of Los Angeles and State of California, have invented new and useful Improvements in Film Magazines for Motion-Picture Cameras, of which the following is a specification.

This invention relates to motion picture cameras, and has for its object the provision of a compact construction wherein the film reels may be mounted in the casing carrying the film actuating mechanism and the shutter mechanism. This result is accomplished by arranging the film reels in superimposed relation upon a common shaft and angularly twisting the film strip between the film exposure guide and the film reels, said angular twists being so arranged that the ends of the loops forming the same are in substantially parallel planes.

The invention will be readily understood from the following description of the accompanying drawings, in which;

Figure 1 is a vertical section through a camera constructed in accordance with the invention.

Fig. 2 is a horizontal section on the line 2—2 of Fig. 1.

Figs. 3 and 4 are vertical sections on the lines 3—3 and 4—4 of Fig. 1.

Fig. 5 is a detail side elevation of one of the sections of the shaft forming a mounting for the film reels.

Fig. 6 is a top plan view of the same.

Fig. 7 is a transverse section on the line 7—7 of Fig. 5.

The camera includes a casing 1 in which is mounted the film reels and the film actuating mechanism and film exposure guide. The shutter mechanism and the lens mounting are carried by a casing 2 fixed upon casing 1 over the film exposure aperture 3. A usual film exposure guide 4 is mounted within casing 1 over the exposure aperture 3, and the film strip actuating mechanism is carried by a shaft 5 extending from top to bottom of the casing 1 at one side of the film exposure guide. The space at the side of shaft 5 opposite the film exposure guide forms a magazine 6 in which the film reels are mounted in superimposed relation upon a column shaft 7 extending from top to bottom of casing 1. A hinged door 8 may form the end of casing 1 beyond the film magazine so that the film reels may be readily removed and placed in position through this door way.

The shaft 5 includes upper and lower sections $5^a$ and $5^b$ carrying the actuating mechanism for the respective film reels, and the adjacent ends of these shaft sections are provided with bevel gears 10 facing toward one another and meshing with opposite sides of a bevel pinion 11 carried upon a shaft 12 extending across the casing 1. This shaft is rotated through suitable gearing 13 by a shaft 14 which extends to the end of casing 1. A usual train of gearing 15 connects the shaft 14 with a crank arm 16 extending outside of the camera casing and having a handle 17 for turning the same.

By this arrangement it will be seen that turning of the crank 16 will rotate shaft sections $5^a$ and $5^b$ in opposite directions so that the film strip moving mechanism carried thereby will withdraw the film strip from one of the reels within the film magazine and will rewind the film strip upon the other reel. Usual shutter actuating mechanism and means for intermittently moving the film strip through the exposure guide are also actuated by the turning of crank 16, but since these parts may be of any usual or preferred construction I have not illustrated the same in the drawings.

The film moving mechanism carried by shafts $5^a$ and $5^b$ may comprise usual drums 19 having peripheral teeth 20 adapted to engage the perforations 21 along the side edges of a film strip. Usual guide rollers 22 are carried by a spring actuated arm 23 in such position as to engage the film strip for guiding its movement past the drums 19.

The shaft 7 upon which the film reels are carried includes a fixed section $7^a$ driven by a pulley and belt connection 22—23 from the shaft 5. Shaft sections $7^b$ and $7^c$ are arranged one above the other upon the shaft section $7^a$ to form the shaft 7. The shaft sections $7^b$ and $7^c$ carry the respective film reels and are independently separable from the assembled shaft 7 so that either of the film reels and its shaft mounting may be readily removed from the camera casing 8.

As an instance of this arrangement each of the shaft sections $7^b$ and $7^c$ may be provided at one end with an angular extension projecting beyond the end of the shaft section at one side thereof, and the opposite end of each of the shaft sections is provided with a similar angular notch 26 in longitudinal alinement with the angular notch extending beyond the opposite end of the shaft section. The upper end of shaft section 7ᵃ is also provided with one of the angular extensions 25.

By the arrangement as thus described it will be seen that the shaft sections carrying film reels may be readily assembled to form shaft 7, and when thus assembled the shaft may be rotated as a unit through the driving connection 22—23. It will also be noted that when it is desired to remove one of the film reels the shaft section carrying the same may be readily removed from the assembled shaft 7 by laterally moving the shaft section and its film reel and withdrawing the same through door 8.

The film reels are shown at 27 as of usual construction including the axial bores 28 having pawls 29 adapted to engage ratchets 30 upon the shaft sections of the film reels. The two film reels assembled within a film magazine are arranged so that their pawl and ratchet connections are oppositely arranged to permit unwinding from one reel while the film strip is wound upon the other reel.

In order to properly position the film reels within the film magazine the side walls of the latter are, preferably, tongued as shown at 31, and said tongues are received in annular grooves 32 provided in the film reels.

It will be noted that in the construction as thus described, the film strip, as it passes the actuating drums 19, extends horizontally of the camera casing. The film exposure guide 4 is arranged in the usual manner whereby the film strip passing through the same is moving vertically with relation to the camera casing, and as a consequence the film strip forms angularly twisted loops 35 between the drums 19 and the respective ends of the film exposure guide. These film loops are arranged somewhat slack and it will be noted that the angular twists in the film position the portion of the film strip passing through the film exposure guide in a plane substantially parallel to the film strip as it passes the actuating drums 19, but that the film strip as it passes said actuating drums is disposed substantially at right angles to the direction of movement of the film strip through the exposure guide.

Various changes may be made without departing from the spirit of the invention as claimed.

What is claimed is:

1. A motion picture camera comprising film reels disposed in planes parallel to each other, a film guide having its ends arranged in the same planes as the reels, and a film wound from one reel to the other and having its intermediate portion extended through the film guide.

2. A motion picture camera comprising superposed film reels disposed in horizontal planes, a vertically disposed film guide having its ends arranged in the same horizontal planes as the reels, and a film wound from one reel to the other and having its intermediate portion extended through the film guide.

In testimony whereof I have signed my name to this specification.

ROLAND J. GIROUX.